United States Patent [19]
Rossi

[11] Patent Number: 5,207,469
[45] Date of Patent: May 4, 1993

[54] TRUCK BED STORAGE UNIT

[76] Inventor: Marc A. Rossi, 43473 Golden Meadow Cir., Ashburn, Va. 22011

[21] Appl. No.: 951,044

[22] Filed: Sep. 24, 1992

Related U.S. Application Data

[63] Continuation of Ser. No. 824,082, Jan. 22, 1992, abandoned.

[51] Int. Cl.5 .............................................. B60R 9/06
[52] U.S. Cl. ................................. 296/37.6; 224/42.42
[58] Field of Search ................ 296/37.6, 43, 37.1; 224/42.42; 410/77, 110

[56] References Cited

U.S. PATENT DOCUMENTS

| | | | |
|---|---|---|---|
| 4,341,412 | 7/1982 | Wayne | 296/39.2 |
| 4,522,326 | 6/1985 | Tuohy | 296/37.6 X |
| 4,531,774 | 7/1985 | Whatley | 296/43 X |
| 4,573,731 | 3/1986 | Knaack et al. | 296/37.6 |
| 4,749,226 | 6/1988 | Heft | 296/37.6 |
| 4,938,398 | 7/1990 | Hallsen | 296/37.6 X |
| 4,946,215 | 8/1990 | Taylor | 296/37.6 |
| 5,083,829 | 1/1992 | Fonseca | 296/37.6 |
| 5,088,636 | 2/1992 | Barajas | 224/42.42 X |

*Primary Examiner*—Dennis H. Pedder
*Attorney, Agent, or Firm*—Parkhurst, Wendel & Rossi

[57] ABSTRACT

A truck bed storage unit is disclosed that is designed to fit adjacent to the tailgate or rear edge of a truck bed. The location of the truck bed storage unit at the rear edge of the truck bed provides easy access to the storage unit.

2 Claims, 2 Drawing Sheets

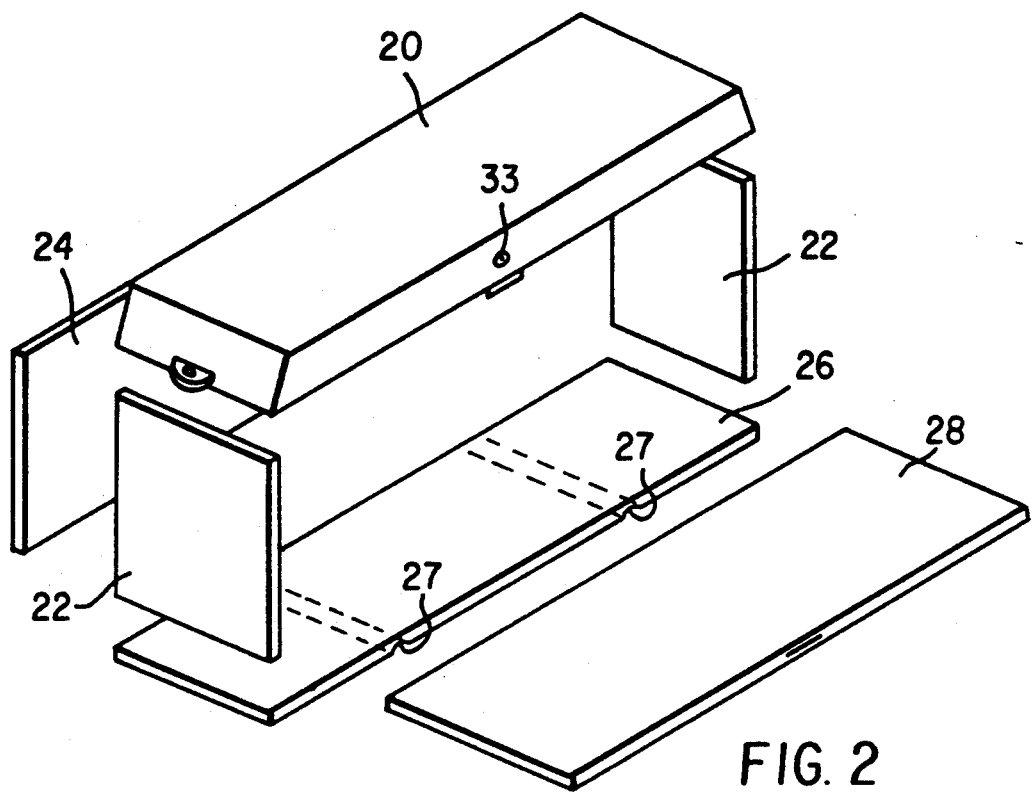
FIG. 2
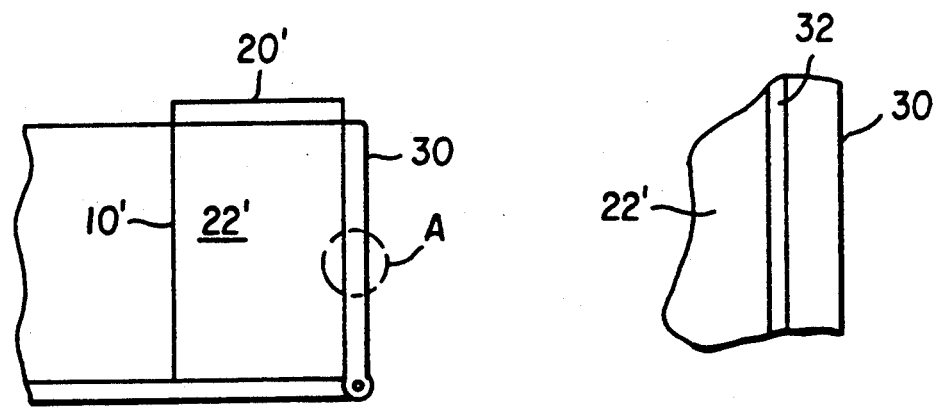
FIG. 3
FIG. 4

TRUCK BED STORAGE UNIT

This is a continuation of application Ser. No. 07/824,082 filed Jan. 22, 1992, now abandoned.

FIELD OF THE INVENTION

The present invention is directed to a storage unit designed to fit within the bed of a truck. More specifically, the present invention is directed to a storage unit that fits on the rear portion of the truck bed adjacent to the tailgate of the truck.

BACKGROUND OF THE INVENTION

Compact pickup trucks have recently become very popular among individuals that use the truck primarily as a passenger vehicle instead of a cargo or work vehicle. The popularity of compact trucks, however, is diminished to some degree by the lack of storage space that is protected from the weather. Truck manufacturers have attempted to compensate for the lack of protected storage space by stretching or extending the size of the truck cab. Such "extended cabs" generally have a small amount of space behind the drivers seat in which articles can be stored. In some cases, an additional seat is provided to carry additional passengers.

Extended cabs, however, are not a satisfactory solution for many prospective buyers. Truck manufacturers usually charge premium prices for the extended cab versions of their trucks, which offsets the advantage of having the additional protected storage space. In addition, the additional storage space provided by the extended cab is not easily accessible for loading groceries, luggage, etc., as the user must reach behind the front seat of the truck.

Conventional efforts to provide additional storage space for trucks have focused on the use of storage units that fit in the truck bed in a position adjacent to the cab of the truck. Such storage units are accessed by reaching over the side of the truck, which is not particularly convenient. The conventional storage units are also designed to primarily hold tools or other small items, and are not practical for carrying groceries or other bulk items.

In view of the above, it is an object of the invention to provide a storage unit for a truck that can be readily and easily accessed to store bulk items that must be protected from the weather.

SUMMARY OF THE INVENTION

The invention provides a storage unit that is designed to fit in the bed of a truck in a location adjacent to the tailgate or end of the truck bed. The storage unit is therefore readily accessible by lowering the tailgate of the truck.

BRIEF DESCRIPTION OF THE DRAWINGS

With the above as background, reference should now be made to the following detailed description of the preferred embodiments of the invention and the accompanying drawings:

FIG. 2 is an exploded view of the embodiment of the invention illustrated in FIG. 1;

FIG. 3 is a side view of a second embodiment of the invention located in the bed of a truck; and FIG. 4 is a close view of a portion of the second embodiment illustrated in FIG. 3.

DETAILED DESCRIPTION OF THE PREFERRED EMBODIMENTS

Figure 1:
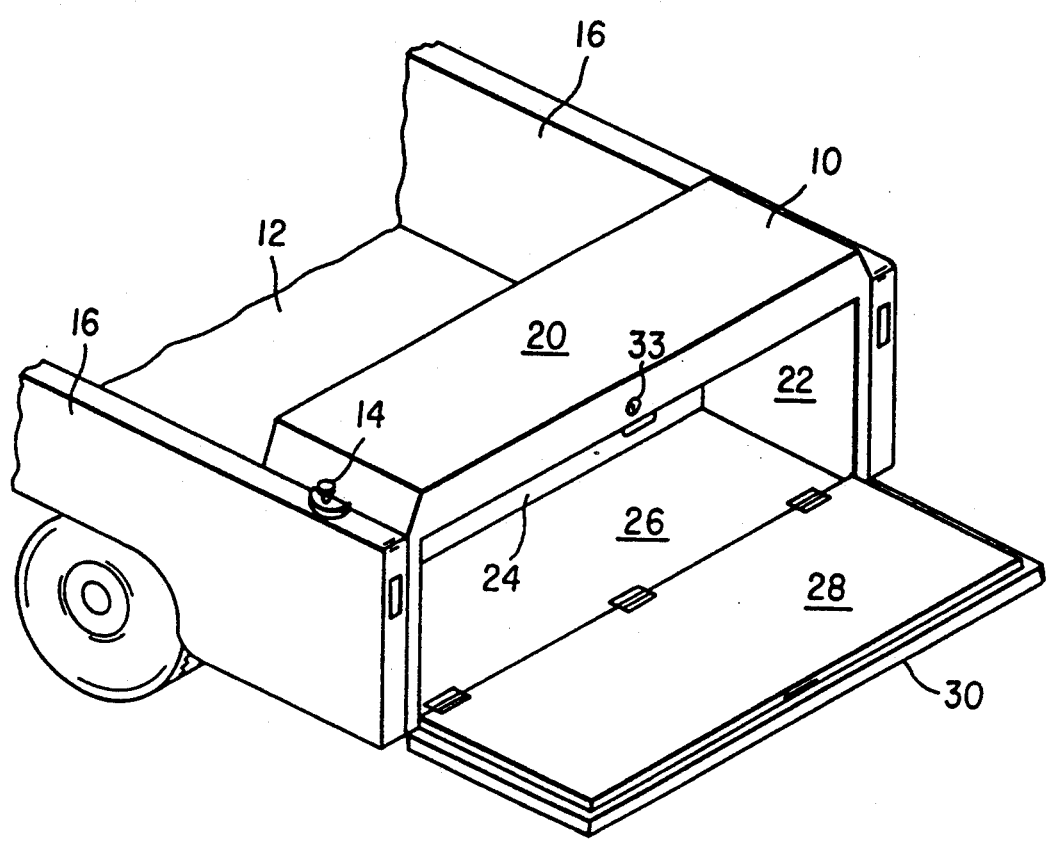
FIG. 1 illustrates a first embodiment of the invention located, in the bed of a truck.

Referring now to FIG. 1, a storage unit 10 in accordance with a first embodiment of the invention is shown located in a bed 12 of a truck. The storage unit 10 is preferably retained in position through the use of removable pins 14 that fit into holes located in the side panels 16 of the bed 12. Thus use of the pins 14 makes it easy to remove the storage unit 10 without tools when the entire bed 12 is required to haul cargo. Although pins are preferred, screws, bolts, clips or any other type of retaining device can be used in place of the pins to hold the storage unit 12 in place.

As shown in greater detail in FIG. 2, the storage unit 12 includes a top panel 20, two side panels 22, a rear panel 24, a bottom panel 26, and a door panel 28 that is hinged to the bottom panel 26. All of the panels are preferably made of a lightweight plastic or fiberglass material, although other materials including composites, metal or wood could be used. The bottom panel 26 preferably includes water passage channels 27 that permit water in the bed 12 to pass under the storage unit 10. Access to the storage unit 10 is gained by lowering the tailgate 30 of the truck (assuming the truck is provided with a tailgate) and lowering the door panel 28. A locking mechanism 33 is provided to secure the door panel 28 in the closed position when cargo has been placed in the storage unit 10.

It should be noted that while the door panel 28 lowers in a manner similar to a tailgate in the preferred embodiment, the door panel 28 can also be made to swing open like a door by hinging it to one of the side panels 22. Two door panels can also be provided instead of one, with each door panel being hinged to one of the side panels 22.

FIG. 3 illustrates a second embodiment of the invention in which the door panel is removed. As shown in FIG. 3, the storage unit 10' is located such that the tailgate 30 of the truck comes in close proximity to, and preferably in contact with, the edges of the side panels 22' and top panel 20' of the storage unit 10'. Thus, the tailgate 30 of the truck functions to close the opening in the storage unit 10'. A gasket 32 is preferably provided on the edges of the side panels 22' and top panel 20' to insure a tight seal is accomplished between the storage unit 10' and the tailgate 30. The provision of a gasket is shown in FIG. 4 which illustrates a portion of the storage unit 10' enclosed by circle A in FIG. 3 A magnetic gasket of the type used in weather strip door frames can be employed for the gasket 32, although other types of gaskets may also be used. The gasket 32 can also be included on the edge of the bottom panel 26 if desired.

The invention has been described with particular reference to certain preferred embodiments thereof. It will be understood, however, that modifications and variations are possible within the scope of the appended claims. For example, the top, side and bottom panels, or combinations thereof, can be molded as a single unit and do not necessarily comprise separate pieces.

I claim:

1. A truck bed storage unit for use with a truck having a bed and bed side panels connected to the bed, the truck bed storage unit including:

a top panel coupled to first and second side panels and a rear panel, wherein portions of the top panel extend over each of the bed side panels when the truck bed storage unit is located in the bed; a bottom panel coupled to the first and second side panels and the rear panel; mean for releasably connecting the storage unit to the bed side panels of the truck at a fixed location adjacent a rear edge of the bed of the truck;

wherein the means for releasably connecting the storage unit to the bed side panels of the truck includes removable pins that fit into holes located in the portions of the top panel that extend over the bed side panels which are aligned with holes located in the bed side panels.

2. A truck bed storage unit as claimed in claim 1, further comprising a door panel coupled to at least one of the bottom panel and the first and second side panels.

* * * * *